(12) United States Patent
Wang

(10) Patent No.: US 10,356,479 B2
(45) Date of Patent: Jul. 16, 2019

(54) DEVICE AND METHOD FOR EDITING CHANNELS OF SMART TV AND SMART TV

(71) Applicant: HISENSE ELECTRIC CO., LTD., Qingdao (CN)

(72) Inventor: Xuelei Wang, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 117 days.

(21) Appl. No.: 15/454,621

(22) Filed: Mar. 9, 2017

(65) Prior Publication Data

US 2017/0188108 A1 Jun. 29, 2017

(30) Foreign Application Priority Data

Dec. 19, 2016 (CN) .......................... 2016 1 1175160
Dec. 19, 2016 (CN) .......................... 2016 1 1179927

(51) Int. Cl.
*H04N 21/482* (2011.01)
*H04N 21/485* (2011.01)
(Continued)

(52) U.S. Cl.
CPC ..... *H04N 21/4821* (2013.01); *H04N 21/4312* (2013.01); *H04N 21/4755* (2013.01); *H04N 21/4858* (2013.01)

(58) Field of Classification Search
CPC ........... H04N 21/4821; H04N 21/4858; H04N 21/4825
See application file for complete search history.

(56) References Cited

U.S. PATENT DOCUMENTS 6,992,728 B2 * 1/2006 Takagi .................. H04H 40/18
348/569
7,117,440 B2 * 10/2006 Gordon .............. H04N 5/44543
715/721
(Continued)

FOREIGN PATENT DOCUMENTS

CN 101212601 A 7/2008
CN 101662621 A 3/2010
(Continued)

OTHER PUBLICATIONS

Extended Search Report from European Patent Application No. 17206325.7 dated Apr. 30, 2018 (6 pages).
(Continued)

*Primary Examiner* — Junior O Mendoza
(74) *Attorney, Agent, or Firm* — Harness, Dickey & Pierce, P.L.C.

(57) ABSTRACT

Disclosed is a device for editing channels of a smart TV. The device includes a memory and at least one processor, wherein the memory stores therein computer readable instructions, wherein the instructions are executed by the at least one processor to enable the at least one processor to: receive an interface calling up instruction, and displaying a channel editing list and an operation prompt on a display screen of the smart TV; receive a channel selecting instruction, and determine a channel to be edited in the channel editing list according to the channel selecting instruction; and receive a channel edit instruction, and edit the channel to be edited according to the channel editing instruction, wherein the operation prompt is configured to remind a user that the channel editing instruction is triggered by using a left arrow key or right arrow key of a remote control, and the channel editing instruction is an instruction indicating dele-
(Continued)

tion or a move of the channel to be edited. Also disclosed are a smart TV, and a method for editing channels of a smart TV.

12 Claims, 9 Drawing Sheets

(51) Int. Cl.
*H04N 21/431* (2011.01)
*H04N 21/475* (2011.01)

(56) References Cited

U.S. PATENT DOCUMENTS

| | | | |
|---|---|---|---|
| 2002/0075408 A1 | 6/2002 | Curreri | |
| 2003/0052905 A1 | 3/2003 | Gordon et al. | |
| 2004/0194135 A1* | 9/2004 | Kahn | H04N 5/44513 725/38 |
| 2005/0177848 A1* | 8/2005 | Hyun | H04N 5/44543 725/44 |
| 2006/0015903 A1* | 1/2006 | MacBeth | H04N 5/44543 725/46 |
| 2009/0083793 A1* | 3/2009 | Lee | H04N 5/44543 725/39 |
| 2011/0030010 A1* | 2/2011 | Overbaugh | H04N 5/44543 725/45 |

FOREIGN PATENT DOCUMENTS

| | | |
|---|---|---|
| CN | 102143341 A | 8/2011 |
| CN | 104615709 A | 5/2015 |

OTHER PUBLICATIONS

Office Action from Chinese Application No. 201611175160.5 dated Mar. 4, 2019 (9 pages).
Office Action from Chinese Application No. 201611179927.1 dated Mar. 25, 2019 (7 pages).

* cited by examiner

DEVICE AND METHOD FOR EDITING CHANNELS OF SMART TV AND SMART TV

CROSS-REFERENCE TO RELATED APPLICATIONS

This application claims the benefit and priority of Chinese Patent Application No. 201611175160.5 filed Dec. 19, 2016 and Chinese Patent Application No. 201611179927.1 filed Dec. 19, 2016. The entire disclosures of the above applications are incorporated herein by reference.

FIELD

The present disclosure relates to the field of television technology and particularly to a device and method for editing channels of a smart TV as well as a smart TV.

BACKGROUND

This section provides background information related to the present disclosure which is not necessarily prior art.

With the development of digital technology, more and more methods for receiving live signals occur, and thus TVs are able to receive more channels, even hundreds of channels from different countries and regions. To get better viewing experience, a user usually edits channels according to personal habits after searching the channels, for example, the user might delete a channel which is not often watched or change the order of channels.

SUMMARY

This section provides a general summary of the disclosure, and is not a comprehensive disclosure of its full scope or all of its features.

In one aspect, embodiments of the disclosure provide a method for editing channels of a smart TV, the method includes:

receiving an interface calling up instruction, and displaying a channel editing list and an operation prompt on a display screen of the smart TV according to the interface calling up instruction;

receiving a channel selecting instruction, and determining a channel to be edited in the channel editing list according to the channel selecting instruction; and receiving a channel editing instruction, and editing the channel to be edited according to the channel editing instruction, where the operation prompt is configured to remind a user that the channel editing instruction is triggered by using a left arrow key or right arrow key of the remote control, and the channel editing instruction is an instruction indicating deletion or a move of the channel to be edited.

In another aspect, based on same inventive conception, embodiments of the disclosure provides a device for editing channels of a smart TV, the device includes:

a display unit, configured to receive an interface calling up instruction, and display a channel editing list and an operation prompt on a display screen of the smart TV according to the interface calling up instruction;

a channel selecting unit, configured to receive a channel selecting instruction, and determine a channel to be edited in the channel editing list according to the channel selecting instruction;

a channel editing unit, configured to receive a channel editing instruction, and edit the channel to be edited according to the channel editing instruction, where the operation prompt is configured to remind a user that the channel editing instruction would be triggered by using a left arrow key or right arrow key of the remote control, and the channel editing instruction is an instruction indicating deletion or a move of the channel to be edited.

Still in another aspect, based on same inventive conception, embodiments of the disclosure provides a smart TV, including a memory, a processor and a computer program stored in the memory which is able to be run on the processor, where the processor is configured to read the computer program stored in the memory and execute the abovementioned method for editing channels of a smart TV.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In addition to the special note, terms 'left' and 'right' mentioned in the present disclosure take a visual angle of user as reference, that is, when a user faces the smart TV or the remote control, 'left' represents left-hand side of user, and 'right' represents right-hand side of user.

Figure 1A:
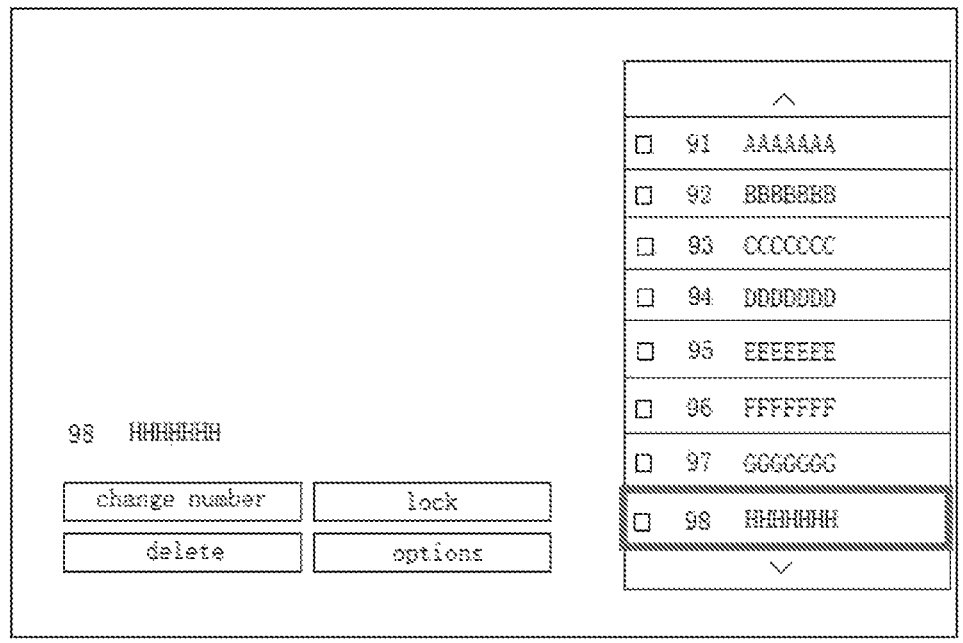
FIG. 1A is a schematic diagram of a channel editing interface according to the related interactive methods.
Figure 1B:
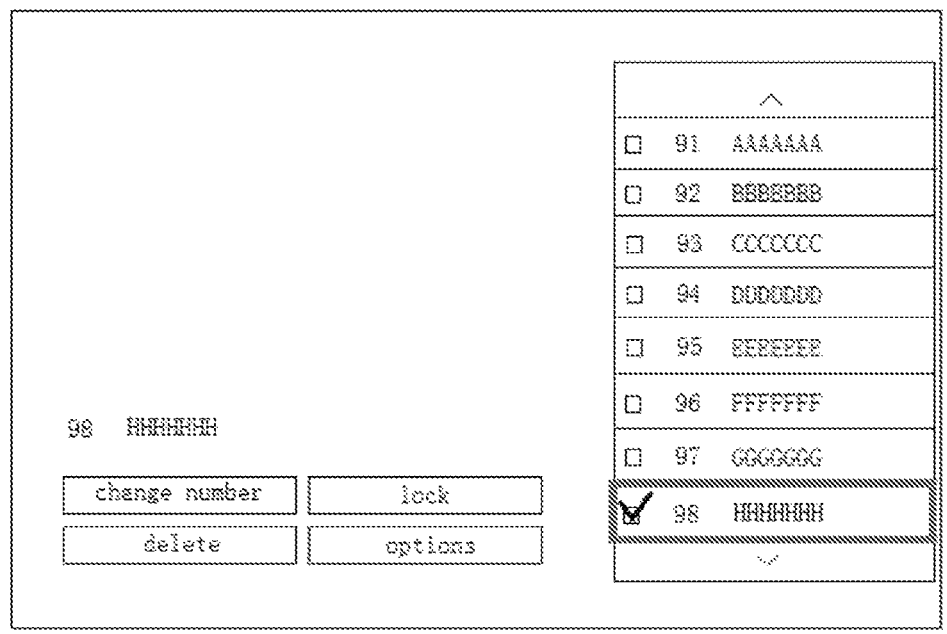
FIG. 1B is a schematic diagram of the selection of a channel to be edited according to the related interactive methods.
Figure 1C:
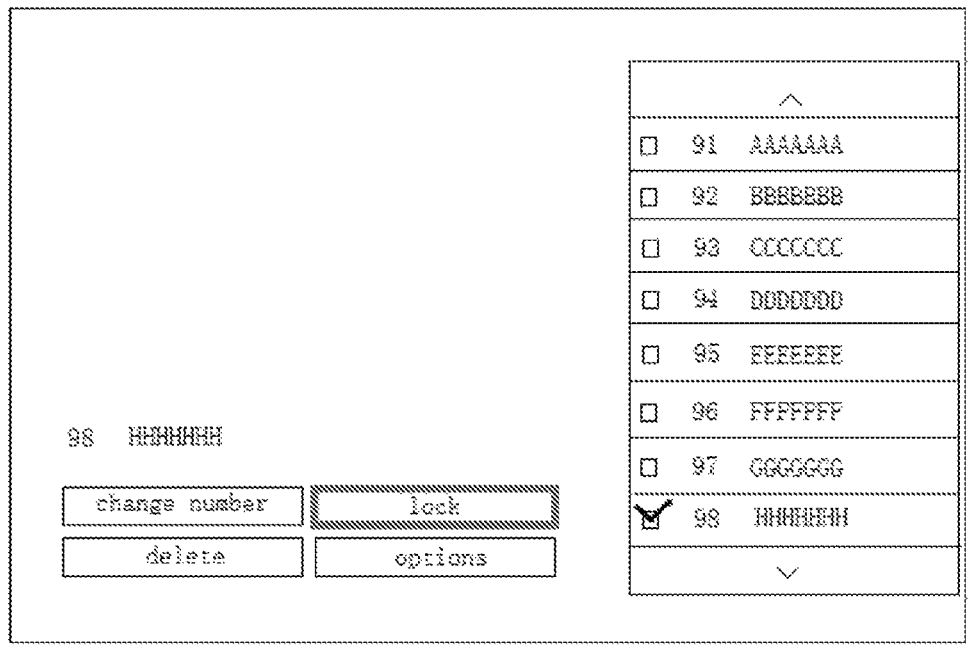
FIG. 1C is a schematic diagram of a move of the operation focus according to the related interactive methods.
Figure 1D:
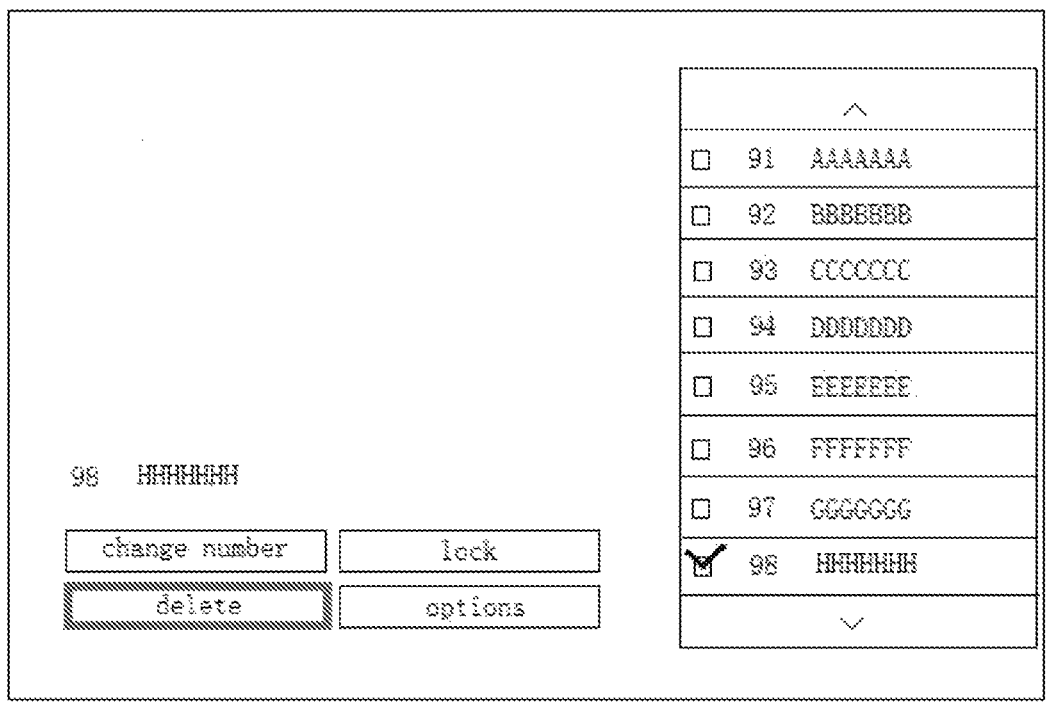
FIG. 1D is a schematic diagram of the selection of an operation control according to the related interactive methods.
Figure 1E:
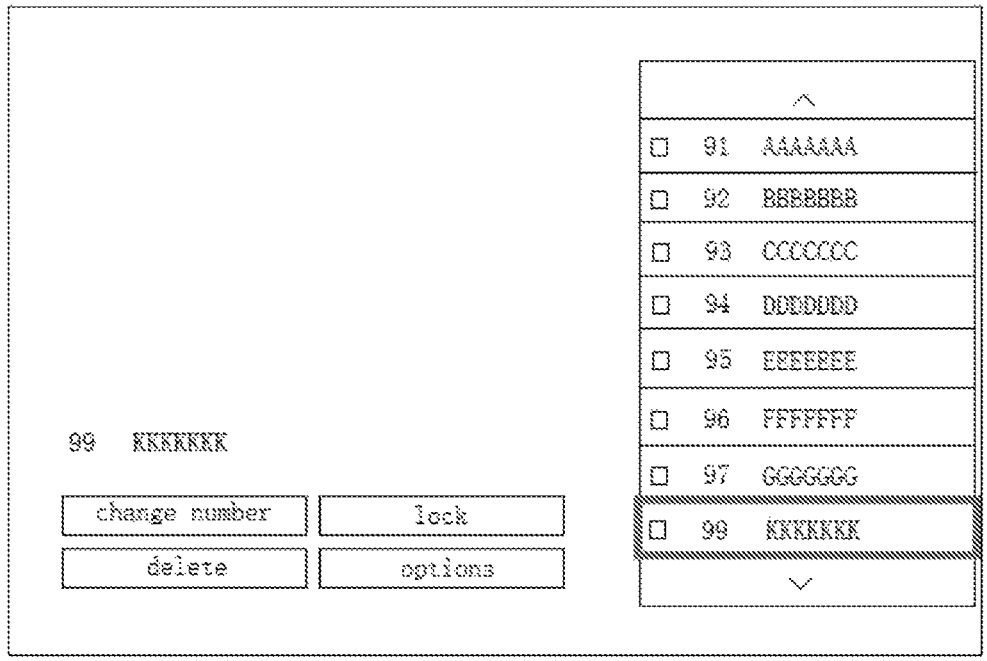
FIG. 1E is a schematic diagram of channel edition according to the related interactive methods.

In related interactive methods for editing channels, when a user needs to edit a certain channel, he/she needs to call up a channel editing list in a channel list, as illustrated in FIG. 1A, where the operation focus in the channel editing list is on the current channel (e.g. the channel 98); then uses arrow keys of the remote control to move the operation focus in the channel editing list, and triggers the confirmation key of the remote control to execute selecting operation when the operation focus is on the name of a channel to be edited, i.e. uses arrow keys and confirmation key of the remote control to select the channel to be edited in the channel editing list, as illustrated by FIG. 1B, where in the channel editing list the check box on the left of '98' is checked to indicate that the channel 98 is selected; and after having selected the channel to be edited, uses arrow keys of the remote control to move the operation focus to the corresponding operation control. If the user needs to delete the channel 98, he/she needs to use arrow keys of the remote control to move the operation focus to where the 'delete' key is, step by step, for example, the operation focus is first moved to the 'lock' key, just as illustrated in FIG. 1C and finally is moved to the 'delete' key, just as illustrated in FIG. 1D, and at last the user triggers the confirmation key of the remote control to control the terminal to execute the channel editing operation corresponding to the 'delete' key, which results in the deletion of the channel 98, just as illustrated in FIG. 1E, where after the channel 98 has been deleted, the channel 99 is shown at the place in the channel editing list where the channel 98 was previously shown.

Before explaining the embodiments of the present disclosure in detail, an application scenario of the embodiments of the present disclosure will be described. The method for editing channels provided by embodiments of the disclosure applies to a smart TV, and the smart TV could be a smart TV with an Android operating system, a smart TV with a Windows operating system, or a smart TV with other operating system, which embodiments of the present disclosure do not limit. Moreover, the smart TV has at least a channel list display function and a channel list editing function, and is able to perform channel editing operation on the channel list displayed on the smart TV according to a user's operation.

Of course, the method for editing channels provided by embodiments of the present disclosure can be also applied to a set-top box connected to a smart TV, where a channel list is stored in the set-top box and could be displayed on the smart TV connected to the set-top box, and the set-top box performs channel editing operation on the stored channel list according to a user's operation. The method for editing channels according to embodiments of the disclosure will be described in detail below, with the application scenario being a smart TV, and the application scenario of a set-top box will not be described, which could refer to the method for editing channels of a smart TV according to embodiments of the disclosure.

The present disclosure provides a method and device for editing channels of a smart TV and a smart TV. When a user needs to edit a channel, an interface calling up instruction could be used to display a channel editing list on the display screen of a smart TV. Then a channel selecting instruction could be used to determine a channel to be edited in the channel editing list. After the user has determined the channel to be edited, he/she could directly trigger an editing operation on the channel to be edited through a left arrow key or right arrow key of the remote control, where the editing operation including deletion operation or move operation. In the method for editing channels provided by embodiments of the present disclosure, after a user has determines a channel to be edited, the user does not need to use an arrow keys to move a current operation focus to a corresponding operation control to trigger a channel editing operation on the channel to be edited, but the user could directly trigger an editing operation on the channel to be edited by using a left arrow key or right arrow key of the remote control, thereby simplifying the operation steps of editing a channel list by a user, increasing the efficiency of editing a channel list by a user and improving interactive experience of a smart TV.

Figure 2:
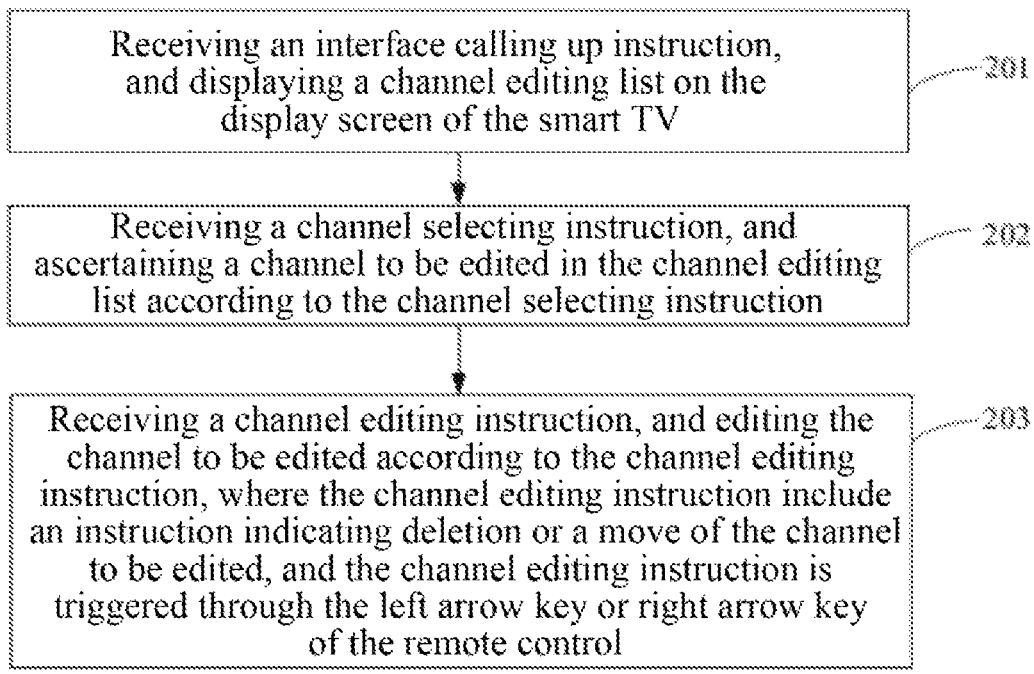
FIG. 2 is a flow chart of a method for editing channels of a smart TV according to some embodiments of the disclosure.

FIG. 2 is a flow chart of a method for editing channels of a smart TV according to some embodiments of the disclosure and the method includes step 201, step 202 and step 203.

Step 201: receiving an interface calling up instruction, and displaying a channel editing list on the display screen of the smart TV.

According to embodiments of the present disclosure, when a smart TV receives an interface calling up instruction from a user, it calls up a channel editing list, which is then displayed on the screen. The interface currently displaying the channel editing list could also be called channel editing interface, where the channel editing list could cover part of the interface currently being displayed.

Figure 4A:
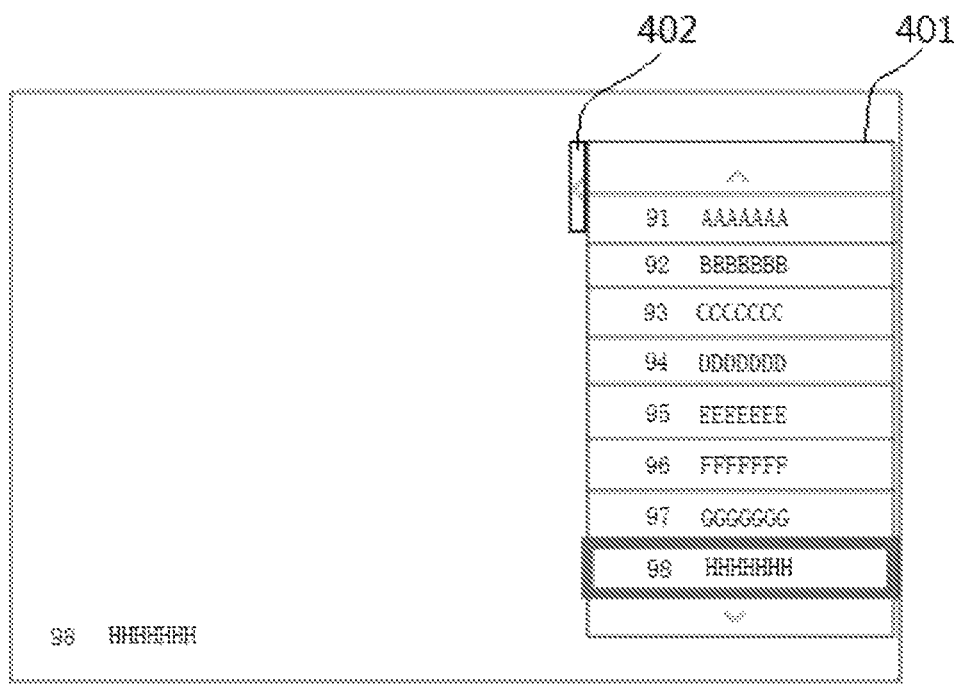
FIG. 4A is a schematic diagram of a channel list according to some embodiments of the disclosure.
Figure 4B:
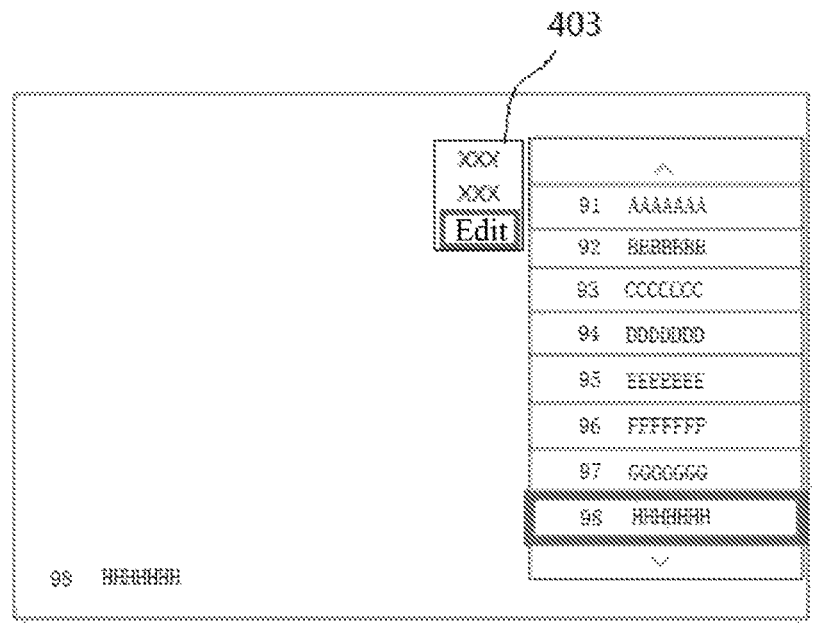
FIG. 4B is a schematic diagram of a function menu of a channel list according to some embodiments of the disclosure.
Figure 4C:
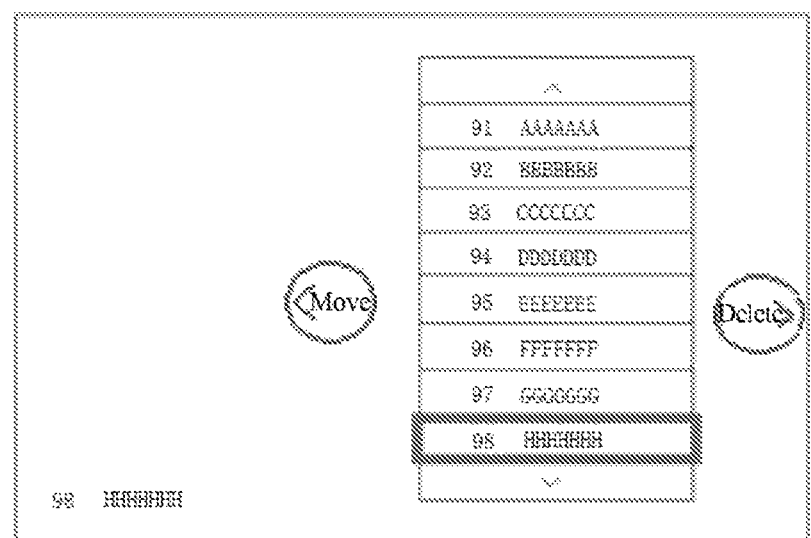
FIG. 4C is a schematic diagram of a channel editing interface where operation prompts are on both sides of a channel editing list according to some embodiments of the disclosure.

As an example illustrated in FIG. 4A, a user could use a corresponding key on the remote control, such as a confirmation key or a channel list key, to trigger the smart TV to display a channel list 401 on the display interface, where the channel list 401 could be displayed over the interface currently being displayed, for example, the channel list 401 could be displayed on the right side of the smart TV's display screen, and a function menu entry 402 is displayed on the left side of the channel list 401. By pressing a corresponding key on the remote control, such as the left arrow key, a function menu 403 related to the channel list (as illustrated in FIG. 4B) could be called up. In the function menu 403, a user could press the down arrow key of the remote control to move the operation focus to the 'edit' menu, and then click the confirmation key to transmit an interface calling up instruction to the smart TV to call up the channel editing list of the current channel list and enter the channel editing interface (as illustrated in FIG. 4C).

Since in related art, when a user is editing channels, he/she needs to perform several steps of operation (for example, clicking the menu-settings-channel management-editing the channels) in the currently displayed interface to call up the channel editing list, and he/she cannot call up the channel editing list directly from a channel list, and thus the user operations are quite complicated. Also, when the channel editing list is being called up, related operation interfaces would cover most of the display screen, which affects the user's viewing effect. However, in embodiments of the present disclosure, a smart TV could pre-store a correlative relationship between a channel editing list and a channel list, and when the smart TV receives an interface calling up instruction triggered by a user through the channel list, it would call up the channel editing list according to the pre-stored correlative relationship between the channel editing list and the channel list. Therefore, the disclosure could call up the channel editing list directly through the channel list, which simplifies the calling up process of the channel editing list, reduces the covered areas of the screen by irrelevant interfaces and improves editing efficiency.

In addition, in embodiments of the present disclosure, when displaying a channel editing list, a smart TV could first determine the position of the channel list on the screen of the smart TV, determine the position of the channel editing list on the screen according to the channel list's position on the screen, and then display the channel editing list on the screen. As the viewing habits of viewers prefer gentle transitions of pictures, it could reduce the amount of changes in the picture to display a channel editing list at the position where a channel list is and would improve a user's visual experience.

Step 202: receiving a channel selecting instruction, and determining a channel to be edited in the channel editing list according to the channel selecting instruction.

In embodiments of the present disclosure, after a channel editing interface has been called up by a smart TV, a smart TV could receive a channel selecting instruction, and determine the channel to be edited in the channel editing list according to the channel selecting instruction. Optionally, the position where the operation focus currently is could be displayed in a highlighted way such as highlighting, boxing, or changing color, and the smart TV would determine that the channel at the same position as the current operation focus is the channel to be edited.

Moreover, in embodiments of the present disclosure, a smart TV could receive an operation focus moving instruction triggered by the user through the up arrow key or down arrow key of the remote control and move the current operation focus upwards or downwards in the channel editing list according to the operation focus moving instruction, and determine that the channel to be edited is the channel where the operation focus currently is, so that the user could select a channel to be edited by moving the operation focus in the channel editing list.

As an embodiment, the method of how a smart TV determines that the channel to be edited is the channel where the operation focus currently is will be described here. Before leaving a factory, a selection label is pre-set for every channel in a smart TV, and the attribute of the selection label corresponding to the channel at the same position as the operation focus is set as 'selected'. For example, it indicates that a selection label is not selected if the flag of the selection label is set as 0, and if it indicates that a selection label is selected if the flag of the selection label is set as 1; the initial value of flags of all the selection labels is 0; when the smart TV detects in a channel editing interface the channel where the operation focus stays, it could change the flag of the selection label corresponding to the channel from 0 to 1, i.e. set the attribute of the selection label corresponding to the channel as 'selected', so that it is determined that the channel whose selection label's attribute is 'selected' is the channel to be edited. For example, as illustrated in FIG. 4C, since the channel at the same position as the current operation focus is the channel 98, the flag of the channel 98's selection label is 1 and the flags of the other channels' selection labels are 0; if a user clicks the up arrow key of the remote control and moves the operation focus to the channel 97, then the flag of the channel 98's selection label would be changed from 1 to 0, and the flag of the channel 97's selection label would be changed from 0 to 1, i.e. it would be determined that the channel 97 is the current channel to be edited. The abovementioned channel selection process is in the single-selection mode.

Since in related art, arrow keys of the remote control is only configured to move the operation focus, and when the operation focus moves to the targeted channel, a user still needs to press a confirmation key so that it would be determined that the channel is the channel to be edited, while the present disclosure could omit the operation on a confirmation key and it is only by moving the operation focus through an arrow key that a channel to be edited could be determined, which improves the channel selection efficiency.

As another embodiment, apart from single-selection mode, the channel selection modes further include multiple-selection mode. A user could send a mode switching instruction to a smart TV by triggering a specified key so that the smart TV enters the multiple-selection mode. When the smart TV receives a mode switching instruction, it could change the current single-selection mode into the multiple-selection mode according to the mode switching instruction, and in the multiple-selection mode, the smart TV could display a multiple-selection label within every channel in the channel editing list, and if the smart TV receives a user's selecting instruction when the operation focus currently is staying at the current channel, then it set the multiple-selection label's attribute of the current channel as 'selected', for example, the flag of the multiple-selection label is set as 0 to indicate 'not selected' and is set as 1 to indicate 'selected'. Then the smart TV could determine that the channel whose multiple-selection label' attribute is 'selected' is a channel to be selected. Repeating the abovementioned multiple-selection operation, a user could select multiple channels as channels to be edited by modifying attributes of multiple channels' multiple-selection labels in the channel editing list.

Figure 4D:
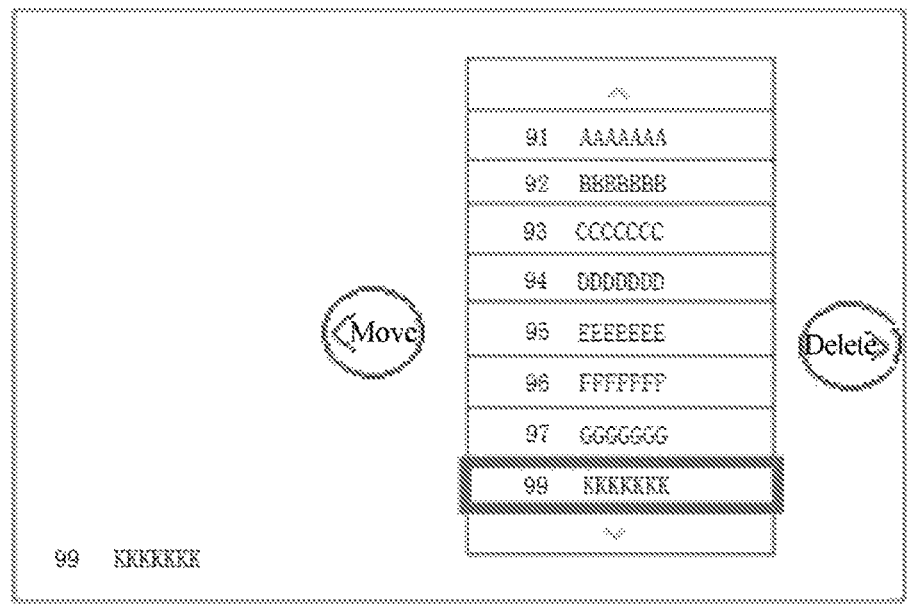
FIG. 4D is a schematic diagram of a channel editing interface where one of the channels has been removed according to some embodiments of the disclosure.
Figure 4E:
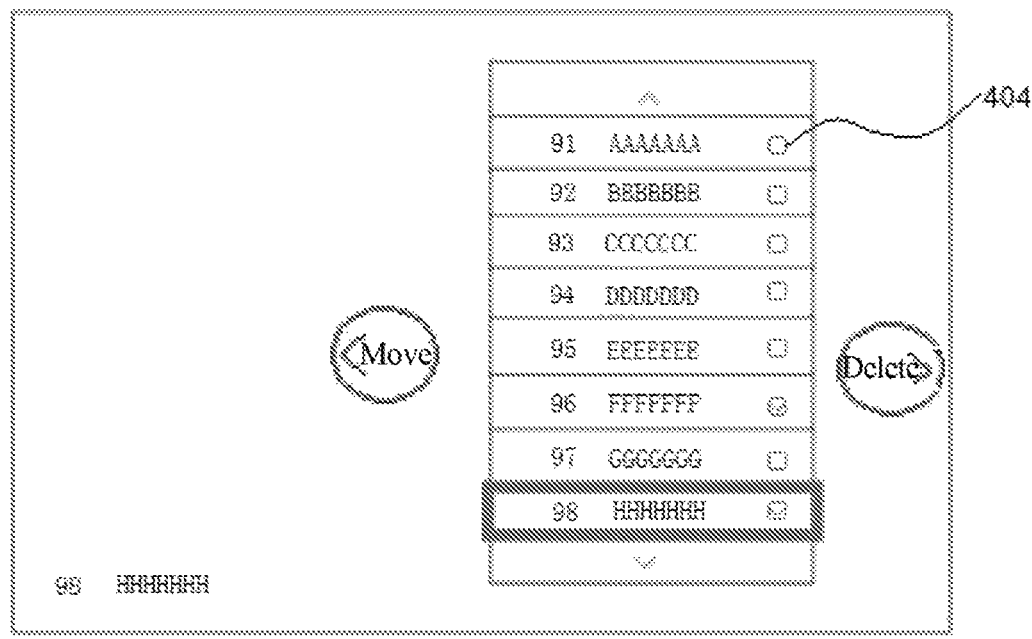
FIG. 4E is a schematic diagram of a channel editing interface in multiple-selection mode according to some embodiments of the disclosure.

As an example illustrated in FIG. 4E, in multiple-selection mode, a multiple-selection box 404 is displayed on the right of every channel in the channel editing list. When a user moves the operation focus through an arrow key of the remote control, and the smart TV receives confirmation triggered by the user pushing the confirmation key, the smart TV changes the attribute of the channel at the same position as the current operation focus into 'selected' (the corresponding multiple-selection box is checked). Then the user moves the operation focus to next channel through an arrow key of the remote control. If the smart TV receives confirmation triggered by the user pressing the confirmation key, the smart TV modifies the attribute of the channel where the operation focus currently is into 'selected' (the corresponding multiple-selection box is checked). And if the user does not press the confirmation key, but continues to move the operation focus, the attribute of the channel at the same position as the current operation focus is 'not selected' (the corresponding multiple-selection box is not checked).

Repeat these steps and finally all the channels whose attributes are 'selected' are determined as channels to be selected. For example, suppose in the multiple-selection mode, the channel at the same position as the operation focus is the channel 96, then the multiple-selection box of the channel 96 is checked, indicating that the channel 96 is selected; when the user presses the down arrow key of the remote control, the operation focus moves to the channel 97, and when the user continues to press the down arrow key, the operation focus moves to the channel 98, the attribute of the channel 97 is still 'not selected' and the multiple-selection box of the channel 97 is not checked; when the operation focus moves to the channel 98, if the user presses the OK key of the remote control, then the attribute of the channel 98 is modified into 'selected' and the multiple-selection box of the channel 98 is checked, i.e. currently the determined channels to be edited are the channel 96 and the channel 98. In this way, a user could edit multiple channels at the same time, the operation process of editing multiple channels is simplified and the efficiency of channel editing is improved.

Step 203: receiving a channel editing instruction, and editing the channel to be edited according to the channel editing instruction, where the channel editing instruction includes an instruction indicating deletion or a move of the channel to be edited, and the channel editing instruction is triggered through the left arrow key or right arrow key of the remote control.

In embodiments of the present disclosure, when a smart TV receives a channel editing instruction from a user, it could edit the channel to be edited according to the channel editing instruction, where the channel editing instruction includes an instruction indicating deletion or a move of the channel to be edited, and the channel editing instruction is triggered by the left arrow key or right arrow key of the remote control. It should be noted that the arrow keys of the remote control in the present embodiments, could be either solid-state physical keys or visual arrow keys of a touch remote control, where the solid state physical keys could include, common arrow keys such as the left arrow key and the right arrow key, or other keys of the remote control which have functions of an arrow key, for example, a key '4' in the numeric keypad may represent a left arrow key, a key '6' in the numeric keypad may represent a right arrow key; and the visual arrow keys could include operation gestures corresponding to the left arrow key and the right arrow key pre-set for the touch remote control by a user, for example, it realizes the function of a left arrow key to slide to the left in the touch area, and it realizes the function of a right arrow key to slide to the right. Said embodiments of keys are just embodiments of the present disclosure, and the methods are not limited.

Solutions of displaying an operation prompt are described in detail below.

As an embodiment, based on the step 201, when a smart TV is calling up the channel editing list, the channel editing interface may display an operation prompts for editing channels, which is configured to remind the user that a channel editing instruction would be triggered through the left arrow key or the right arrow key of the remote control, so that the user would trigger an channel editing operation according to the operation prompt. As an example illustrated in the FIG. 4C, the operation prompts displayed on both sides of the channel editing list are, icon of the left arrow key and the word 'move' on the left side, as well as the icon of the right arrow key and the word 'delete' on the right side, so that a user could edit channels according to the arrow keys and their corresponding operation shown in the operation prompts.

Optionally, a smart TV could display the channel editing list and operation prompts for editing channels, so that a user could trigger a channel editing instruction according to an operation prompt. Optionally, contents and position on the screen of an operation prompt could be pre-set in a smart TV, when the display screen of the smart TV displays a channel editing list, an operation prompt is displayed in the channel editing interface according to the preset contents and position of the operation prompt, for example, different operation prompts are displayed on the same side of the channel editing list, or different operation prompts are displayed on both sides of the channel editing list, where the operation prompts include deletion prompts and move prompts for the channel to be edited. Optionally, the position of an operation prompt relative to the channel editing list is the same as the position of an arrow key of the remote control corresponding to a channel editing instruction. A term 'relative' mentioned herein only illustrates that a position of the operation prompt is on left or right of the channel editing list in left and right direction, but not limit a distance and angle between the position and the channel editing list.

Display modes of operation prompts are described in detail by the following three cases.

Case 1

A smart TV displays deletion prompt for a channel to be edited on the left of the channel editing list, and displays move prompt for the channel to be edited on the right of the channel editing list, where the channel editing instruction for deleting a channel to be edited could be triggered through the left arrow key of the remote control, and the channel editing instruction for moving a channel to be edited could be triggered by through the right arrow key of the remote control.

Optionally, if the function corresponding to the left arrow key of the remote control is deleting a channel to be edited, then the deletion prompt for the channel to be edited is displayed on the left of the channel editing list, so that a user is reminded that the left arrow key of the remote control is corresponding to the deletion operation on the channel to be edited, i.e. a user may trigger the deletion operation on the channel to be edited by pressing the left arrow key of the remote control. If the function corresponding to the right arrow key of the remote control is moving a channel to be edited, then the move prompt for the channel to be edited is displayed on the right of the channel editing list, so that a user is reminded that the right arrow key of the remote control is corresponding to the move operation on the channel to be edited, i.e. a user may trigger the move operation on the channel to be editing by pressing the right arrow key of the remote control. In summary, the direction of a prompt relative to the channel editing list takes the direction of the remote control's key corresponding to the channel editing operation on the remote control as a reference, i.e., the direction of the prompt relative to the channel editing list takes the direction of the remote control's key corresponding to the channel editing operation relative to the OK key of the remote control as reference, which intuitively reminds a user of which key triggering what channel editing operation and improves the user's operating experience.

Case 2

A smart TV displays the deletion prompt for a channel to be edited on the right of the channel editing list, and displays the move prompt for the channel to be edited on the left of the channel editing list, where the channel editing instruction indicating deletion of the channel to be edited would be triggered through the right arrow key of the remote control, and the channel editing instruction indicating a move of the channel to be edited would be triggered through the left arrow key of the remote control.

Optionally, if the corresponding function of the right arrow key of the remote control is to delete a channel to be edited, then the deletion prompt for the channel to be edited is displayed on the right of the channel editing list, in order to remind the user that the right arrow key of the remote control is corresponding to the deletion operation on the channel to be edited, which means that the user could trigger a deletion of the channel to be edited by pressing the right arrow key of the remote control. If the corresponding function of the left arrow key of the remote control is to move a channel to be edited, then the move prompt for the channel to be edited is displayed on the left of the channel editing list, in order to remind the user that the left arrow key of the remote control is corresponding to the move operation on the channel to be edited, which means the user could trigger a move of the channel to be edited by pressing the left arrow key of the remote control. In summary, the direction of a prompt relative to the channel editing list takes the direction of the remote control's arrow key corresponding to the channel editing operation on the remote control as reference, i.e., the direction of the prompt relative to the channel editing list takes the direction of the remote control's key corresponding to the channel editing operation relative to the OK key of the remote control as reference, in order to intuitively remind the user of which key triggering what channel editing operation and enhance the user's operating experience.

Case 3

Figure 4F:
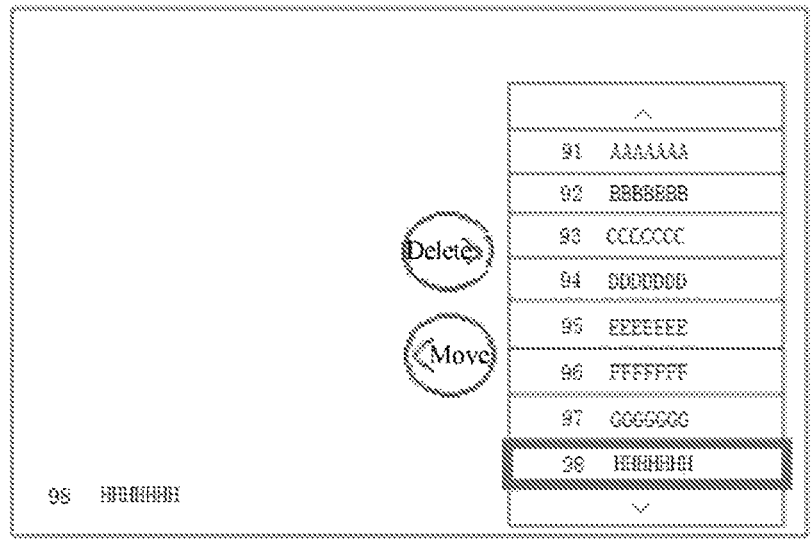
FIG. 4F is a schematic diagram of a channel editing interface where operation prompts are on the same side of a channel editing list according to some embodiments of the disclosure.

A smart TV displays the deletion prompt and move prompt for a channel to be edited on one side of the channel editing list in the form of one prompt above the other prompt, where the channel editing instructions indicating deletion and a move of a channel to be edited would be triggered through the left or right arrow key of the remote control. As illustrated in FIG. 4F, the smart TV displays the deletion prompt and move prompt on the left of the channel editing list in the form of one prompt above the other prompt, and as an example, the deletion prompt is above the move prompt, where the deletion operation indicated by the deletion prompt would be triggered by the right arrow key of the remote control, and the move operation indicated by the move prompt would be triggered by the left arrow key of the remote control. FIG. 4F is just an exemplary display mode of the case 3.

Therefore, the present disclosure could enable a user learn the operating method of editing channels more intuitively by displaying operation prompt in the channel editing interface, it is unnecessary for the user to look for and memorize operation keys corresponding to editing operations from the many keys of the remote control, so the user's editing efficiency is improved and the user's operating experience is enhanced.

Figure 4G:
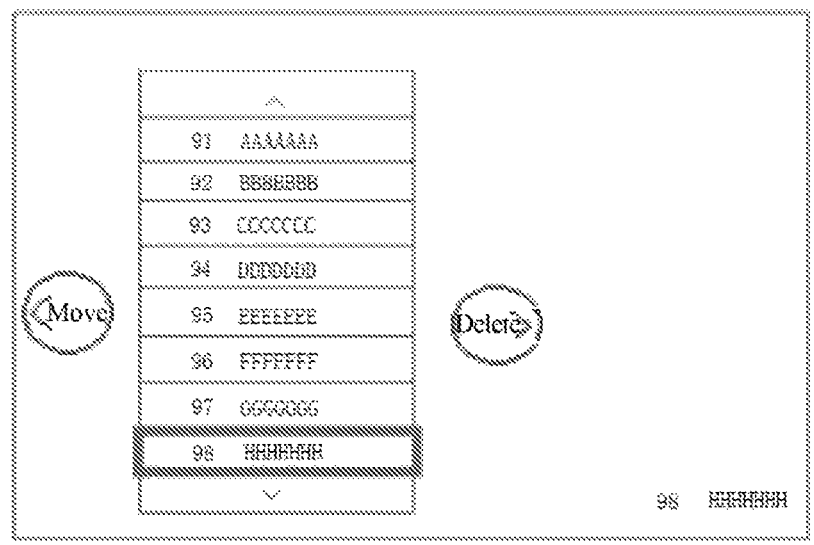
FIG. 4G is a schematic diagram of another channel editing interface where operation prompts are on both sides of a channel editing list according to some embodiments of the disclosure.

In some embodiments of the present disclosure, before displaying operation prompt for editing channels, a smart TV could first judge whether the channel editing list is on the left side or right side of its display screen. As illustrated in FIG. 4G, if the channel editing list is on the left side of the display screen, then the deletion prompt for a channel to be edited is displayed on the left of the channel editing list, the move prompt for the channel to be edited is displayed on the right of the channel editing list, and a favorite channel list (not illustrated) is displayed on the right side of the display screen, where the channel editing instruction indicating deletion of the channel to be edited would be triggered through the left arrow key of the remote control, and the channel editing instruction indicating a move of the channel to be edited would be triggered by the right arrow key of the remote control, so that when a user triggers the channel editing instruction indicating a move of the channel to be edited through the right arrow key of the remote control, the channel to be edited would be moved to the favorite channel list. As illustrated in FIG. 4C, if the channel editing list is displayed on the right side of the display screen, then the deletion prompt for the channel to be edited is displayed on the right of the channel editing list, the move prompt for the channel to be edited is displayed on the left of the channel editing list, and the favorite channel list (not illustrated) is displayed on the left side of the display screen, where the channel editing instruction indicating deletion of the channel to be edited would be triggered by the right arrow key of the remote control, and the channel editing instruction indicating a move of the channel to be edited would be triggered by the left arrow key of the remote control, so that when a user triggers the channel editing instruction indicating a move of the channel to be edited through the left arrow key of the remote control, the channel to be edited would be moved to the favorite channel list. No matter which side of the display screen the favorite channel list is on, the move prompt for the channel to be edited is displayed between the channel editing list and favorite channel list. Since users have different viewing habits and some users might be accustomed to the channel editing list on the left side of the display screen, to make a smart TV suitable in different situations, the present disclosure could display operation prompts according to the channel editing list's position and thus enhancing the user's view experience.

In some embodiments, when the channel editing list is on the left side of the smart TV's display screen, if a user triggers the channel editing instruction indicating a move of the channel to be edited through the right arrow key of the remote control, then the favorite channel list is displayed on the right side of the smart TV's display screen, and the channel to be edited is moved to the favorite channel list. When the channel editing list is on the right side of the smart TV's display screen, if a user triggers the channel editing instruction indicating a move of the channel to be edited through the left arrow key of the remote control, then the favorite channel list is displayed on the left side of the smart TV's display screen, and the channel to be edited is moved to the favorite channel list.

Figure 4H:
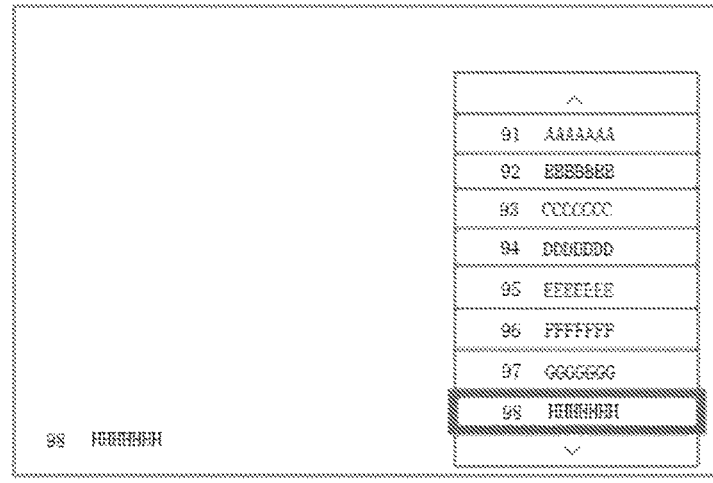
FIG. 4H is a schematic diagram of a channel editing interface which does not display any operation prompts according to some embodiments of the disclosure.

As another embodiment, the channel editing interface does not display any operation prompt, as illustrated in FIG. 4H, in which case a user could use specified editing operation keys of the remote control such as the deletion key and the move key, to perform channel editing operations. Of course, optionally, if the corresponding function of the left arrow key of the remote control is to delete a channel to be edited, and the corresponding function of the right arrow key is to move a channel to be edited, then the deletion prompt for the channel to be edited is displayed on the left of the channel editing list and the move prompt is displayed on the right of the channel editing list; if the corresponding function of the right arrow key of the remote control is to delete the channel to be edited, and the corresponding function of the left arrow key of the remote control is to move the channel to be edited, then the deletion prompt for the channel to be edited is displayed on the right of the channel editing list, and the move prompt for the channel to be edited is displayed on the left of the channel editing list; so that it is unnecessary for a user to memorize any remote control's keys corresponding to channel editing operations, and the user could trigger a channel editing operation according to an operation prompt, which improves the user's operating experience.

To make the purpose, technical solution and advantages of the present disclosure clearer, the solution of the present disclosure will be further described in detail with reference to FIG. 3, FIG. 4A, FIG. 4B, FIG. 4C and FIG. 4D.

Figure 3:
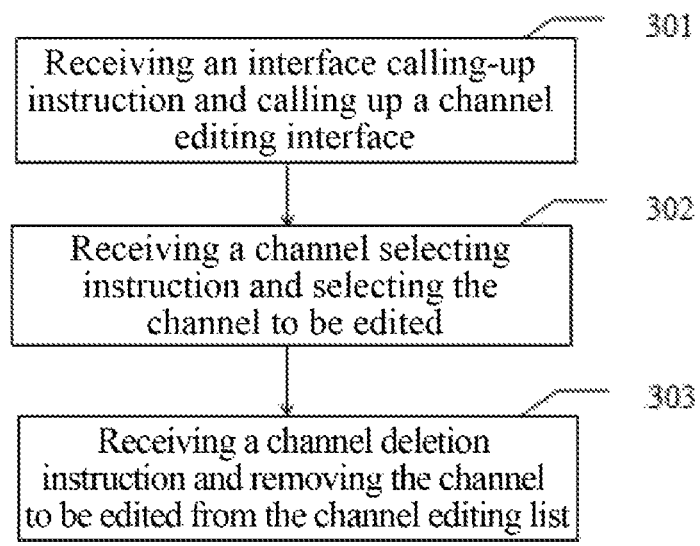
FIG. 3 is a flow chart of a channel's editing process according to some embodiments of the disclosure.

Refer to FIG. 3, which is a flow chart of the channel editing process according to an embodiment of the present disclosure, where the channel editing process is applied to a smart TV and it includes step 301, step 302 and step 303.

Step 301: receiving an interface calling up instruction and calling up a channel editing interface.

In this embodiment, the interface of the channel list in illustrated in FIG. 4A, where the channel list 401 is displayed on the right side of the screen, a function menu entry 402 is displayed on the left of the channel list 401, it may call up a function menu 403 (as illustrated in FIG. 4B) related to the channel list when pressing a corresponding key of the remote control such as the left arrow key and in the function menu 403, a user could press a down arrow key of the remote control to move the operation focus to the 'edit' menu, and send an interface calling up instruction by pressing the confirmation key. When the smart TV receives the interface calling up instruction triggered by the user, it may obtain the channel editing interface corresponding to the interface calling up instruction and call up the channel editing interface to the interface currently being displayed. In this process, the smart TV first determines the position of the channel list, and displays the channel editing list at the position where the channel list is. Since in FIG. 4B the channel list is on the right side of the screen, the channel editing list is also on the right side of the channel editing interface, as illustrated in FIG. 4C; then the smart TV displays operation prompts according to the position of the channel editing list, for example, in FIG. 4C the channel editing list is on the right side of the screen, then the smart TV displays the move prompt on the left of the channel editing list, and displays the deletion prompt on the right of the channel editing list, where the channel operation instruction indicating a move of a channel to be edited would be triggered through the left arrow key of the remote control, and the channel editing instruction indicating a deletion of the channel to be edited would be triggered by the right arrow key of the remote control.

Step 302: receiving a channel selecting instruction and selecting the channel to be edited.

In this step, before receiving a channel selecting instruction, a smart TV may also judge whether the current selection mode is single-selection mode or multiple-selection mode. In this embodiment, when a user enters the channel editing interface, the single-selection mode could be enabled by default, and if the user presses the confirmation key of the remote control, then the smart TV switches to multiple-selection mode.

In the single selection mode, when the user enters the channel editing interface, the channel at the same position of the operation focus is the channel to be edited, as illustrated in FIG. 4D, where the rectangular box represents the operation focus, and the current channel attributes of the channel is set to 'selected'. When a user presses the up or down arrow key of the remote control to move the focus, the smart TV modifies the attribute of the channel where the operation focus is into 'selected, and modifies the attribute of the previously selected channel to 'not selected'. The operation focus currently is at the position of the channel 98, and thus the current channel to be edited is the channel 98.

Step 303: receiving a channel deletion instruction and removing the channel to be edited from the channel editing list.

In this embodiment, the deletion label 'Deleted' could be defined in channels' attributes (it represents 'normal' if the value of the label is 0 and it represents 'deletion' if the value of the label is 1). When a user triggers the channel deletion instruction by pressing the left arrow key of the remote control according to the operation prompt, then the smart TV marks the deletion label of the channel to be edited as 'deletion', i.e. the value of the label 'Deleted' equals 1, to realize the deletion operation of the channel. After the channel has been removed, as illustrated in FIG. 4C, the channel 98 in the channel editing list has been removed and the next channel, the channel 99, is displayed at the position where the channel 98 previously is, the operation focus moves to the position of the channel 99, and the user may continue to edit channels.

According to the channel editing process illustrated in FIG. 3, in the present disclosure, through the up or down arrow key, the operation focus could be moved at the same time as a channel to be edited is selected, and channel editing operation could be triggered through the left or right arrow key, so that the present disclosure could simplify the operation process and promote channel editing efficiency, where the operation is simple, less part of the display interface is covered and the interactive experience of the smart TV is improved.

Based on the same conception, the present disclosure also provides a device for editing channels of a smart TV. The device could be realized through software, through hardware or through a combination of software and hardware. Take software implementation as an example. The device for editing channels of a smart TV according to the present disclosure, as a logical device, is realized by the CPU of an apparatus where the device for editing channels is reading and running corresponding computer program instruction in the memory.

Figure 5A:
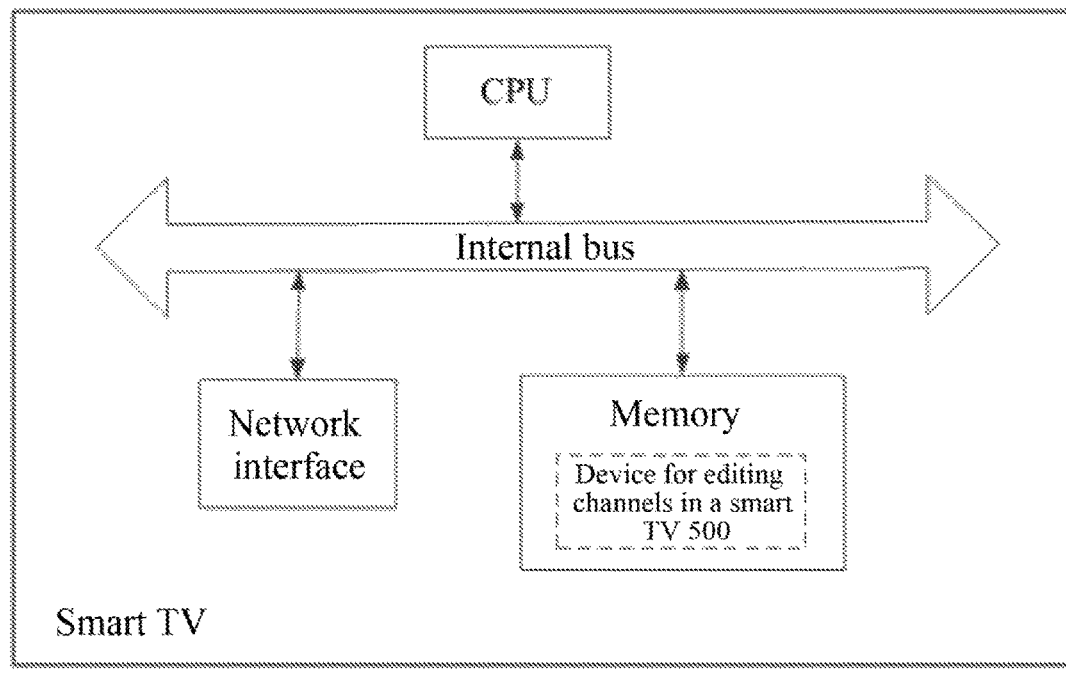
FIG. 5A is a hardware structural diagram of an apparatus including a device for editing channels of a smart TV according to some embodiments of the disclosure.
Figure 5B:
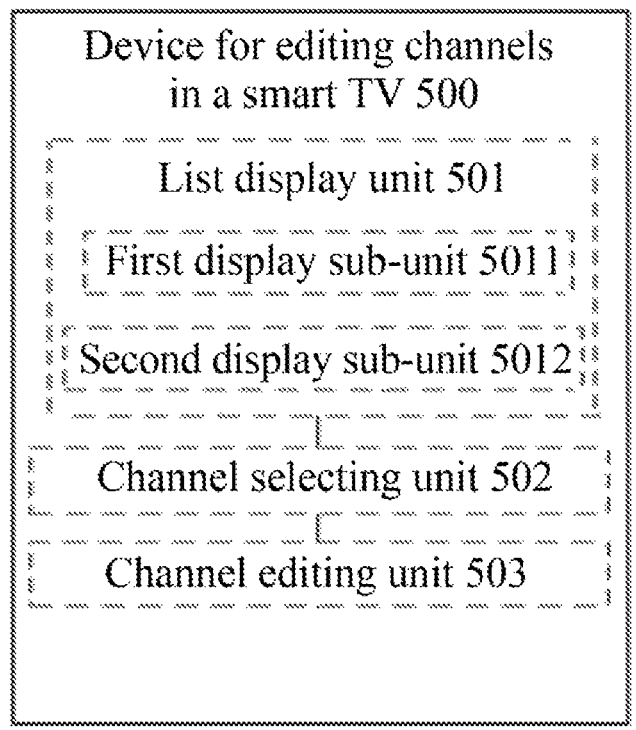
FIG. 5B is a logical structural diagram of a device for editing channels of a smart TV according to some embodiments of the disclosure.

Refer to FIG. 5A, which is a device 500 for editing channels of a smart TV according to one of the embodiments of the present disclosure. The basic operating environment of the device includes a CPU, a memory and other hardware. Logically, the logical structure of the device 500 is illustrated in FIG. 5B, which includes:

a list display unit 501, configured to receive an interface calling up instruction and display a channel editing list on the display screen of the smart TV according to the interface calling up instruction;

a channel selecting unit 502, configured to receive a channel selecting instruction, and determine a channel to be edited in the channel editing list according to the channel selecting instruction;

a channel editing unit 503, configured to receive a channel editing instruction, and perform editing operation corresponding to the channel editing instruction on the channel to be edited, where the channel editing instruction includes instruction indicating deletion or a move of the channel to be edited, and the channel editing instruction is triggered by the left arrow key or right arrow key of the remote control.

Optionally, the list display unit 501 is configured to display the channel editing list and operation prompts for editing channels on the display screen of the smart TV.

Optionally, the list display unit 501 includes:

a first display sub-unit 5011, configured to display the channel editing list on the display screen of the smart TV;

a second display sub-unit 5012, configured to display different operation prompts on both sides of the channel editing list, where the operation prompts include prompts indicating deletion and move of the channel to be edited, and the positions of the operation prompts relative to the channel editing list take the positions of the channel editing instructions corresponding to the remote control's arrow keys as reference, that is, positions of the operation prompts relative to the channel editing list take positions of a left arrow key and a right arrow key of the remote control as reference, wherein the left arrow key and the right arrow key are arranged symmetrically in vertical.

Optionally, the second display sub-unit 5012, is configured to display the deletion prompt for the channel to be edited on the left of the channel editing list and display the move prompt for the channel to be edited on the right of the channel editing list, where the channel editing instruction indicating a deletion of the channel to be edited would be triggered by the left arrow key of the remote control, and the channel editing instruction indicating a move of the channel to be edited would be triggered by the right arrow key of the remote control.

Optionally, the second display sub-unit 5012, is configured to display the deletion prompt for the channel to be edited on the right of the channel editing list and display the move prompt for the channel to be edited on the left of the channel editing list, where the channel editing instruction indicating a deletion of the channel to be edited would be triggered by the right arrow key of the remote control, and the channel editing instruction of the channel to be edited would be triggered by the left arrow key of the remote control.

Optionally, the second display sub-unit 5012 is configured to determine whether the channel editing list is on the left side or right side of the smart TV's display screen. If the channel to be edited is on the left side of the smart TV's display screen, then the deletion prompt for the channel to be edited is displayed on the left of the channel editing list, and the move prompt for the channel to be edited is displayed on the right of the channel editing list, where the channel editing instruction indicating deletion of the channel to be edited would be triggered through the left arrow key of the remote control, and the channel editing instruction indicating a move of the channel to be edited would be triggered by the right arrow key of the remote control. If the channel to be edited is displayed on the right side of the smart TV's display screen, then the deletion prompt for the channel to be edited is displayed on the right of the channel editing list and the move prompt for the channel to be edited is displayed on the left of the channel to be edited, where the channel editing instruction indicating deletion of the channel to be edited would be triggered through the right arrow key of the remote control, and the channel editing instruction indicating a move of the channel to be edited would be triggered through the left arrow key of the channel to be edited.

Optionally, the channel selecting unit 502 is configured to determine that the channel at the same position as the current operation focus is the channel to be edited.

Optionally, the channel selecting unit 502 is configured to receive operation focus moving instructions, where the operation focus moving instruction would be triggered through an up arrow key or down arrow key of the remote control; to move the current operation focus upwardly and downwardly in the channel editing list according to the operation focus moving instruction; and to determine that the channel at the same position as the current operation focus is the channel to be edited.

Optionally, the channel selecting unit 502 is also configured to receive a mode switching instruction and switch the current single-selection mode into multiple-selection mode according to the mode switching instruction; to display a multiple-selection label in every channel of the channel editing list, and if a selecting instruction from the user is received when the current operation focus stays in the current channel, to set the attribute of the current channel's multiple-selection label to be 'selected'; and to determine that the channel whose multiple-selection label's attribute is 'selected' is the channel to be selected.

The implementation process of functions and effects of respective units of the abovementioned device is described in detail in the implementation process of corresponding steps in the abovementioned method, so it will not be described again here.

Since the device embodiments substantially correspond to the method embodiments, for their details, please refer to descriptions of correlative parts of the method embodiments. The device embodiments described above are merely illustrative, where the units described as separated units may or may not be physically separated; a module shown as a unit may or may not be a physical unit, i.e., a module could be located at one place or be distributed to multiple network elements. Part or all of the modules could be selected to fulfill the purposes of the present disclosure according to actual needs. Those skilled in the art would be able to understand the present disclosure and put it into practice without making any creative efforts.

In addition, based on the same conception, embodiments of the present disclosure also provides a smart TV, which includes a memory, a processor and a computer program stored in the memory and able to be run by the processor, where the processor is configured to read the computer program stored in the memory and execute any of the method for editing channels of a smart TV provided by the present disclosure. For embodiments of the smart TV, please refer to the abovementioned embodiments of the method for editing channels of a smart TV, and repeated parts would not be described any more.

In summary, the present disclosure provides a method and device for editing channels of a smart TV and a smart TV. When a user needs to edit channels, a channel editing list could be displayed on the display screen of the smart TV through an interface calling up instruction; then a channel to be edited in the channel editing list could be determined through a channel selecting instruction; after the user determines the channel to be edited, he/she could directly trigger an editing operation on the channel to be edited through the left arrow key or right arrow key of the remote control, where the editing operation includes deletion or a move of the channel to be edited. The method for editing channels according to embodiments of the present disclosure, after a user has determined a channel to be edited, it is unnecessary for he/she to move the current operation focus to a corresponding operation control through an arrow keys of the remote control in order to trigger a channel editing operation on the channel to be edited, but he/she may directly triggers an editing operation on the channel to be edited through a left arrow key or right arrow key of the remote control, so that the method for editing channels according to embodiments of the present disclosure simplifies the operation steps for a user to edit channel list, improves the efficiency of a user editing channels, and enhances the interactive experience of the smart TV.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for editing channels of a smart TV, the device comprising: a memory and at least one processor, wherein the memory is configured to store computer readable instructions, and wherein the at least one processor to execute the computer readable instructions to:
  receive an interface calling up instruction, display a channel editing list on a display screen of the smart TV, and determine whether the channel editing list is on a left side or a right side of the display screen;
  when the channel editing list is on the left side of the display screen, display a deletion prompt for the channel to be edited to the left of the channel editing list and display a move prompt for the channel to be edited to the right of the channel editing list, wherein the deletion prompt is configured to remind a user that a channel editing instruction indicating a deletion of the channel to be edited would be triggered by using a left arrow key of a remote control, and the move prompt is configured to remind a user that a channel editing instruction indicating a move of the channel to be edited would be triggered by using a right arrow key of the remote control;
  when the channel editing list is on the right side of the display screen, display a deletion prompt for the channel to be edited to the right of the channel editing list and display a move prompt for the channel to be edited to the left of the channel editing list, wherein the deletion prompt is configured to remind a user that a channel editing instruction indicating a deletion of the channel to be edited would be triggered by using the right arrow key of the remote control, and the move prompt is configured to remind a user that a channel editing instruction indicating a move of the channel to be edited would be triggered by using the left arrow key of the remote control;
  receive a channel selecting instruction, and determine a channel to be edited in the channel editing list according to the channel selecting instruction; and
  receive the channel editing instruction, and edit the channel to be edited according to the channel editing instruction.

2. The device according to claim 1, wherein the at least one processor is configured to execute the computer readable instructions to:
  determine that a channel at the same position as a current operation focus is the channel to be edited; or
  receive an operation focus moving instruction triggered by using an up arrow key or a down arrow key of the remote control, move a current operation focus upwardly and downwardly in the channel editing list according to the operation focus moving instruction, and determine that a channel at the same position as the current operation focus is the channel to be edited; or
  receive a mode switching instruction, switch a current single-selection mode into a multiple-selection mode according to the mode switching instruction, display a multiple-selection label in every channel of the channel editing list, if a selecting instruction from a user is received when a current operation focus is staying in a current channel, set an attribute of multiple selection label of the current channel selected, and determine that a channel whose multiple-selection label's attribute is selected is a channel to be selected.

3. The device according to claim 1, wherein the at least one processor is configured to execute the computer readable instructions to:
  when the channel editing list is displayed on the left side of the display screen, display a favorite channel list on the right side of the display screen, so that when a user triggers a channel editing instruction indicating a move of the channel to be edited by using the right arrow key of the remote control, the channel to be edited is moved to the favorite channel list; and
  when the channel editing list is displayed on the right side of the display screen, display a favorite channel list on the left side of the display screen, so that when a user triggers a channel editing instruction indicating a move of the channel to be edited by using the left arrow key of the remote control, the channel to be edited is moved to the favorite channel list.

4. The device according to claim 1, wherein the at least one processor is configured to execute the computer readable instructions to:
  when the channel editing list is displayed on the left side of the display screen, and a user presses the right arrow key of the remote control to trigger a channel editing instruction indicating a move of the channel to be edited, display a favorite channel list on the right side of the display screen and move the channel to be edited to the favorite channel list; and
  when the channel editing list is displayed on the right side of the display screen, and a user presses the left arrow key of the remote control to trigger a channel editing instruction indicating a move of the channel to be edited, display the favorite channel list on the left side of the display screen and move the channel to be edited to the favorite channel list.

5. A smart TV comprising a memory and at least one processor, wherein the memory is configured to store computer readable instructions, and wherein the at least one processor is configured to execute the computer readable instructions to:
  receive an interface calling up instruction, display a channel editing list on a display screen of the smart TV according to the interface calling up instruction, and determine whether the channel editing list is on a left side or a right side of the display screen;
  when the channel editing list is on the left side of the display screen, display a deletion prompt for the channel to be edited to the left of the channel editing list and display a move prompt for the channel to be edited to the right of the channel editing list, wherein the deletion prompt is configured to remind a user that a channel editing instruction indicating a deletion of the channel to be edited would be triggered by using a left arrow key of a remote control, and the move prompt is configured to remind a user that a channel editing instruction indicating a move of the channel to be edited would be triggered by using a right arrow key of the remote control;
  when the channel editing list is on the right side of the display screen, display a deletion prompt for the channel to be deleted to the right of the channel editing list and display a move prompt for the channel to be edited to the left of the channel editing list; wherein the deletion prompt is configured to remind a user a channel editing instruction indicating a deletion of the channel to be edited would be triggered by using the right arrow key of the remote control, and the move prompt is configured to remind a user that a channel editing instruction indicating a move of the channel to be edited would be triggered by using the left arrow key of the left arrow key of the remote control;

receive a channel selecting instruction, and determine a channel to be edited in the channel editing list according to the channel selecting instruction; and receive the channel editing instruction, and edit the channel to be edited according to the channel editing instruction.

6. The smart TV according to claim 5, wherein the at least one processor is configured to execute the computer readable instructions to:

determine that a channel at the same position as a current operation focus is the channel to be edited; or receive an operation focus moving instruction triggered by using an up arrow key or a down arrow key of the remote control, move a current operation focus upwardly and downwardly in the channel editing list according to the operation focus moving instruction, and determine that a channel at the same position as the current operation focus is the channel to be edited; or receive a mode switching instruction, switch a current single-selection mode into a multiple-selection mode according to the mode switching instruction, display a multiple-selection label in every channel of the channel editing list, if a selecting instruction from a user is received when a current operation focus is staying in a current channel, setting an attribute of multiple selection label of the current channel selected, and determine that a channel whose multiple-selection label's attribute is selected is a channel to be selected.

7. The smart TV according to claim 5, wherein the at least one processor is configured to execute the computer readable instructions to:

when the channel editing list is displayed on the left side of the display screen, display a favorite channel list on the right side of the display screen, so that when a user triggers a channel editing instruction indicating a move of the channel to be edited by using the right arrow key of the remote control, the channel to be edited is moved to the favorite channel list; and when the channel editing list is displayed on the right side of the display screen, display a favorite channel list on the left side of the display screen, so that when a user triggers a channel editing instruction indicating a move of the channel to be edited by using the left arrow key of the remote control, the channel to be edited is moved to the favorite channel list.

8. The smart TV according to claim 5, wherein the at least one processor is configured to execute the computer readable instructions to:

when the channel editing list is displayed on the left side of the display screen, and a user presses the right arrow key of the remote control to trigger a channel editing instruction indicating a move of the channel to be edited, display a favorite channel list on the right side of the display screen and move the channel to be edited to the favorite channel list; and when the channel editing list is displayed on the right side of the display screen, and a user presses the left arrow key of the remote control to trigger a channel editing instruction indicating a move of the channel to be edited, display the favorite channel list on the left side of the display screen and move the channel to be edited to the favorite channel list.

9. A method for editing channels of a smart TV, the method comprising:

receiving an interface calling up instruction, displaying a channel editing list on a display screen of the smart TV according to the interface calling up instruction and determining whether the channel editing list is on a left side or a right side of the display screen;

when the channel editing list is on the left side of the display screen, displaying a deletion prompt for the channel to be edited to the left of the channel editing list and displaying a move prompt for the channel to be edited to the right of the channel editing list, wherein the deletion prompt is configured to remind a user that a channel editing instruction indicating a deletion of the channel to be edited would be triggered by using a left arrow key of a remote control, and the move prompt is configured to remind a user that a channel editing instruction indicating a move of the channel to be edited would be triggered by using a right arrow key of the remote control;

when the channel editing list is on the right side of the display screen, displaying a deletion prompt for the channel to be edited to the right of the channel editing list and displaying a move prompt for the channel to be edited to the left of the channel editing list, wherein the deletion prompt is configured to remind the user that a channel editing instruction indicating a deletion of the channel to be edited would be triggered by using the right arrow key of the remote control, and the move prompt is configured to remind the user that a channel editing instruction indicating a move of the channel to be edited would be triggered by using the left arrow key of the remote control;

receiving a channel selecting instruction, and determining a channel to be edited in the channel editing list according to the channel selecting instruction; and receiving the channel editing instruction, and editing the channel to be edited according to the channel editing instruction.

10. The method according to claim 9, wherein receiving the channel selecting instruction, and determining the channel to be edited in the channel editing list according to the channel selecting instruction comprises:

determining that a channel at the same position as a current operation focus is the channel to be edited; or receiving an operation focus moving instruction triggered by using an up arrow key or a down arrow key of the remote control, moving a current operation focus upwardly and downwardly in the channel editing list according to the operation focus moving instruction; and determining that a channel at the same position as the current operation focus is the channel to be edited; or receiving a mode switching instruction, switching a current single-selection mode into a multiple-selection mode according to the mode switching instruction, displaying a multiple-selection label in every channel of the channel editing list, if a selecting instruction from a user is received when the current operation focus is staying in the current channel, setting an attribute of the multiple selection label of a current channel selected, and determining that a channel whose multiple-selection label's attribute is selected is a channel to be selected.

11. The method according to claim 9, further comprising:

when the channel editing list is displayed on the left side of the display screen, displaying a favorite channel list on the right side of the display screen, so that when a user triggers a channel editing instruction indicating a move of the channel to be edited by using the right arrow key of the remote control, the channel to be edited is moved to the favorite channel list; and when the channel editing list is displayed on the right side of the display screen, displaying a favorite channel list on the left side of the display screen, so that when a user triggers a channel editing instruction indicating a move of the channel to be edited by using the left arrow key of the remote control, the channel to be edited is moved to the favorite channel list.

12. The method according to claim 9, further comprising:

when the channel editing list is displayed on the left side of the display screen, and a user presses the right arrow key of the remote control to trigger a channel editing instruction indicating a move of the channel to be edited, displaying a favorite channel list on the right side of the display screen and moving the channel to be edited to the favorite channel list; and when the channel editing list is displayed on the right side of the display screen, and a user presses the left arrow key of the remote control to trigger a channel editing instruction indicating a move of the channel to be edited, displaying the favorite channel list on the left side of the display screen and moving the channel to be edited to the favorite channel list.

* * * * *